United States Patent
Ferens

(10) Patent No.: US 6,950,322 B2
(45) Date of Patent: Sep. 27, 2005

(54) REGULATED AC TO DC CONVERTER FOR AEROSPACE APPLICATIONS

(75) Inventor: Jerzy Ferens, Smithtown, NY (US)

(73) Assignee: RSM Electron Power, Inc., Deer Park, NY (US)

( * ) Notice: Subject to any disclaimer, the term of this patent is extended or adjusted under 35 U.S.C. 154(b) by 31 days.

(21) Appl. No.: 10/410,914

(22) Filed: Apr. 10, 2003

(65) Prior Publication Data

US 2004/0202012 A1 Oct. 14, 2004

(51) Int. Cl.$^7$ ................................................ H02M 1/14
(52) U.S. Cl. ........................................ 363/44; 363/65
(58) Field of Search ............................ 363/71, 17, 39, 363/44–48, 65, 67, 69, 84, 124, 125

(56) References Cited

U.S. PATENT DOCUMENTS

| | | | | |
|---|---|---|---|---|
| 4,488,211 A | | 12/1984 | Miyairi | |
| 4,739,466 A | * | 4/1988 | Glennon et al. | 363/89 |
| 5,050,059 A | * | 9/1991 | Neeser et al. | 363/65 |
| 5,541,830 A | * | 7/1996 | Moore et al. | 363/69 |
| 6,058,031 A | * | 5/2000 | Lyons et al. | 363/67 |
| 6,154,378 A | * | 11/2000 | Peterson et al. | 363/37 |
| 6,178,102 B1 | * | 1/2001 | Stanley | 363/44 |
| 6,256,209 B1 | * | 7/2001 | Gurwicz et al. | 363/17 |
| 6,256,213 B1 | | 7/2001 | Illingworth | |
| 6,297,973 B1 | * | 10/2001 | Jian-Ping et al. | 363/37 |
| 6,498,736 B1 | * | 12/2002 | Kamath | 363/44 |

* cited by examiner

*Primary Examiner*—Gary L Laxton
(74) *Attorney, Agent, or Firm*—Larry Liberchuk, Esq.

(57) ABSTRACT

In high-efficiency power source applications, AC power is converted to DC power, which is isolated from the source and regulated. A level of performance is achieved that exceeds the power quality requirements of MIL-STD-704 over the extended frequency range, typically from about 360 Hz to 800 Hz. While high-efficiency and low-weight of the invention, among other benefits, are advantageous primarily in airborne systems, its use can be extended to terrestrial applications as well. The isolation, regulation and the main power processing are achieved by low-weight, high-frequency conversion stages arranged in 2 channels that produce the line harmonic content typical of the 12-pulse rectification. Control of the conversion stages provides effective rejection of line transients, while output ripple voltage is typically an order of magnitude lower than in conventional transformer rectifier units.

20 Claims, 9 Drawing Sheets

REGULATED AC TO DC CONVERTER FOR AEROSPACE APPLICATIONS

FIELD OF THE INVENTION

The present invention relates to the aerospace AC to DC converters operating from fixed or variable-frequency sources and providing regulated 28 VDC power with low ripple content. The regulated AC to DC converter of the present invention can be used as replacement for conventional Transformer Rectifier Units or as a DC Power Source in modern aircraft systems.

BACKGROUND OF THE INVENTION

Major portion of the three-phase 400 Hz power in a typical aircraft system is converted into isolated, Low Voltage 28 VDC power, using simple and reliable method based on 12-Pulse Rectification. Typical converter used for that purpose, Transformer Rectifier Unit (TRU), is shown in FIG. 1. As illustrated in the figure, TRU 10 includes isolating transformer 12 having secondary windings arranged in Delta/Star, other secondary winding configurations, for example zig-zag, are being used as well. Transformer 12 is very bulky and heavy because, among other things, its primary and secondary windings must be rated for full power. Also included in TRU 10 are two 6-pulse, line-commutated rectifiers 14 and 16. TRU 10 further requires interphase reactor 18 to combine the two rectification channels into a single output, as shown in FIG. 1.

Major drawbacks of conventional Transformer Rectifier Units are:
1. Lack of voltage regulation: the output voltage fluctuates typically between 30V and 26V depending on the input voltage and load variations.
2. Transparency to voltage transients generated in the AC distribution network: the relative magnitude of the switching transients, voltage sags and surges appear on the DC side with little or no attenuation.
3. High ripple content: typically the ripple peak-to-peak voltage is in the range of 2.0 to 3.0V In order to mitigate these undesirable effects, special pre-regulators or line conditioners are being used to protect some sensitive avionic devices and provide a better quality, regulated DC power.

The use of variable frequency power in modern aircraft systems—a radical departure from the established use of 400 Hz power—had aggravated the operating conditions for conventional Transformer Rectifier Units even further, as most of them are not designed to operate from variable frequency sources.

In airborne applications, equipment low weight is an important directive influencing a number of design decisions. For that reason, most of the prior art solutions are mainly focused on regulation aspects, but do not provide significant improvements in ripple content or immunity to input line transients. Also, the prior art devices do not include operation over the extended frequency range.

Prior art according to U.S. Pat. No. 5,541,830 achieves regulation by operating the Neutral Point Controller interconnecting either primary or secondary windings of the 12-pulse transformer. This technique, relying on classical, line-commutated conversion and relatively heavy low-frequency magnetics, has inherently slow response to rapid changes in load current and line voltage that may create instability in some systems. In addition, the ripple content in the output waveform is increased due to delayed conduction of the SCR switches. Additional filtering using heavy, low-frequency magnetics or more complex, active filtering will generally be required to achieve compliance with power quality standards.

Another prior art solution that can be used to achieve regulation in 12-pulse AC to DC conversion is shown in U.S. Pat. No. 4,488,211. Regulation is executed here by two 6-pulse SCR bridges, connected respectively to delta and wye secondary windings of the 12-pulse transformer. The conversion circuitry includes also an SCR-based active filter for suppression of harmonic and ripple effects. Like in the previous example, this solution relies on line-commutated conversion techniques to achieve regulation and uses low-frequency magnetics for isolation and filtering, leading to increase in weight and size.

The solution described in U.S. Pat. No. 4,739,466 uses a switch-mode converter cascaded with the conventional 12-pulse transformer rectifier and acting to boost the output voltage by connecting its output in series with the output of the transformer rectifier. In addition to the low-frequency components of the transformer rectifier, the circuitry includes a Boost Isolating Transformer, Boost inductor, and additional capacitor. An added weight comes from the need to increase the power rating of the 12-pulse transformer and interphase reactor in order to carry the losses in the boost section. The circuitry can operate with relatively low ripple content and immunity to the line transients due to the filtering effect the boost converter provides. Its use is limited, however, to applications where a lower efficiency can be tolerated.

Prior art according to U.S. Pat. No. 6,256,213 uses two low-frequency 12-pulse transformer-rectifiers in series-parallel connection, where the first transformer-rectifier is connected directly to the output of the converter, while the second transformer-rectifier supplies an incremental power to this output via a Boost Converter operated in a closed-loop voltage-regulation mode. The second transformer-rectifier includes an additional 12-pulse rectifier, connected in parallel to the converter's output with the purpose to support the converter's current during short-circuit and startup conditions (the boost converter inherently can not operate in a short-circuit conditions). Since the described converter provides the output power mainly through the uncontrolled rectifier bridges, it cannot disable its operation in response to abnormal conditions like overcurrent, overvoltage or overtermperature. In such cases, external means are required to disconnect the flow of power.

Common characteristic of the prior art is the use of low-frequency 12-pulse transformers for voltage reduction and isolation. The regulation techniques used in the prior art provide acceptable steady-state regulation with limited dynamic performance, inherent in circuits based on line-commutated power conversion. The output voltage typically carries a high ripple component and disturbances transpiring from the primary power lines.

A need, therefore, exists for a system, device and method to address and remedy the above-described disadvantages of the prior art.

SUMMARY OF THE INVENTION

It is an object of the present invention to provide a system, device and method for converting AC power to DC power and providing an excellent output regulation.

It is another object of the present invention to have a system, device and method for providing a regulated AC to DC converter that blocks transients generated in the AC distribution network from appearing on the output side.

It is a further object of the present invention to have a system, device and method for providing a regulated AC to DC converter that eliminates high ripple content at the output.

It is a further object of the present invention to have a system, device and method for providing a regulated AC to DC converter that comprises lightweight components.

According to the present invention, an AC power source generates 3-phase AC power of fixed or variable frequency, which is received, phase-shifted and divided into 2 channels by an input autotransformer. Coupled to the autotransformer, a set of 6-pulse rectifiers in each channel rectifies the phase-shifted AC power, which is chopped by a switching converter in each channel. A step-down transformer also in each channel, respectively coupled to the switching converters, isolates and steps down the chopped power. An output rectifier in each channel, respectively coupled to the step-down transformers, further rectifies the stepped down power. A filter, coupled to the output rectifiers, filters the further rectified power to produce a low ripple DC power that is regulated by controlling each switching converter.

BRIEF DESCRIPTION OF THE DRAWINGS

The foregoing and other features of the present invention will be more readily apparent from the following detailed description and drawings of one or more illustrative embodiments of the present invention in which.

DETAILED DESCRIPTION OF EMBODIMENTS

As a general overview, the present invention includes a system, device and method for converting AC power to regulated DC power. In one embodiment, the regulated AC to DC converter of the present invention enables a level of performance that exceeds the power quality requirements of MIL-STD-704 over the extended frequency range, typically from about 360 Hz to 800 Hz. While high-efficiency and low-weight of the AC to DC converter, among other benefits, are advantageous primarily in airborne systems, its use can be extended to terrestrial applications as well.

According to the present invention, the isolation, regulation and the main power processing are achieved by low-weight, high-frequency conversion stages arranged in 2 channels that produce the line harmonic content typical of the 12-pulse rectification when connected to the AC source using a phase-shifting autotransformer. Control achieved by the present invention provides effective rejection of the line transients, while the output ripple voltage is typically an order of magnitude lower than in the conventional TRU.

Figure 1:
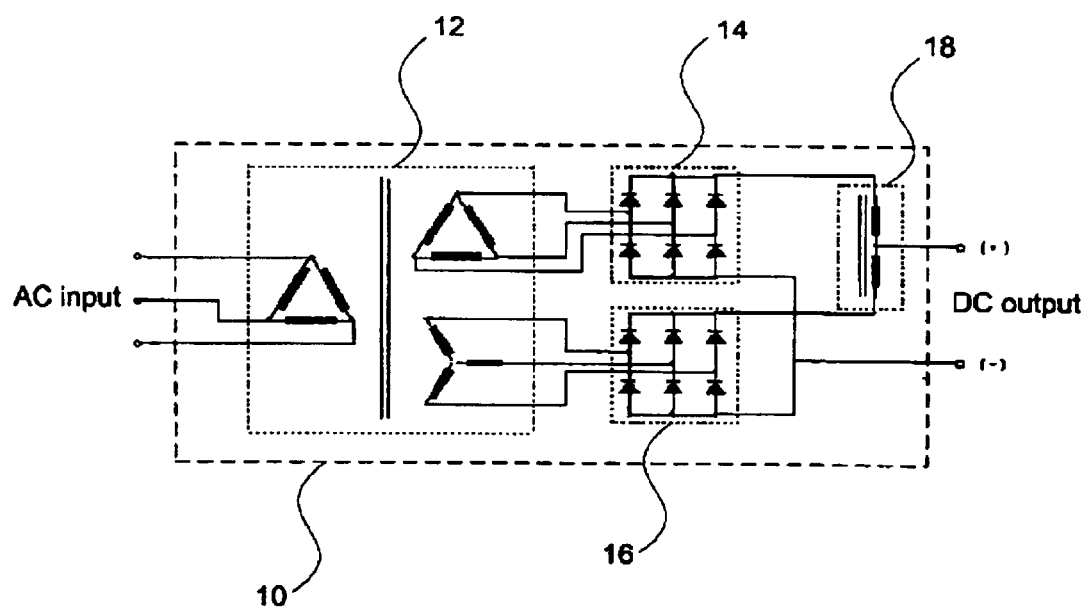
FIG. 1 shows a block diagram of the conventional TRU.
Figure 2:
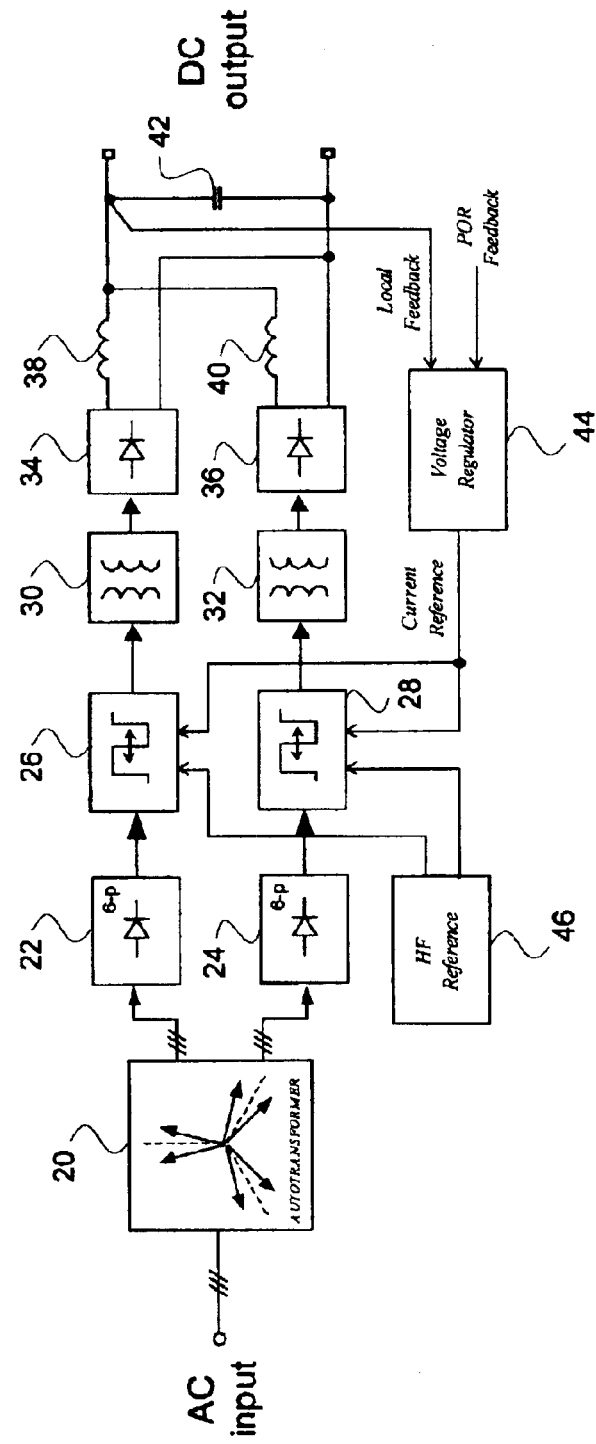
FIG. 2 shows a block diagram of one embodiment of a regulated AC to DC converter according to the present invention.

Referring now to the figures, FIG. 2 shows a block diagram of RTR according to one embodiment of the present invention. Phase-shifting autotransformer 20 receives AC power from a primary source, such as a generator coupled to an engine, for example, either directly or indirectly. The choice of phase-shifting autotransformer 20 for the 12-pulse rectification significantly reduces its VA rating and weight, being a fraction of the rating and weight of a conventional, isolated 12-pulse transformer. As further shown in FIG. 2, the current from autotransformer 20 is divided into 2 substantially identical channels forming the so-called isolated high-frequency conversion stages. Two sets of full-bridge 6-pulse rectifiers 22, 24 receive the alternating current from autotransformer 20 for subsequent rectification. Rectifiers 22, 24 output the rectified current to two high-frequency switching converters 26, 28 operating in a pulse-width modulation (PWM) mode. According to the present invention, current programming of switching converters 26, 28 provides control of the high-frequency conversion stages. This ensures an equal loading of the two 6-pulse rectifier channels for a suitable 12-pulse rectification. Switching converters 26, 28 may be the continuous input-current types, such as Boost-Buck, providing a constant-current load for the rectifying stages.

As further illustrated in FIG. 2, the output isolation and voltage step down are achieved through the use of transformers 30, 32. In particular, these inherently lightweight high-frequency transformers link switching converters 26, 28 with output rectifiers 34, 36, respectively. Output rectifiers 34, 36 are provided at the output stages for the conversion of high-frequency power into DC power. As shown in FIG. 2, the rectified power from output rectifiers 34, 36 flows into a single output through inductors 38, 40 that limit the amplitude of the high-frequency ripple currents. Output capacitor 42, connected across the output terminals of the RTR, calculates the combined ripple currents from the two channels, thereby smoothing DC output current and maintaining stable DC output voltage across the output terminals.

High Frequency (HF) Reference unit 46 controls power converters 26, 28 in such a way that the high-frequency PWM waveform generated in one channel is shifted substantially half switching cycle with respect to the PWM waveform of the other channel. Upon combining the waveforms from the two channels at the output stage, the effect of the phase shifting is to double the frequency of the ripple currents flowing through output capacitor 42, enabling its reduction in size and weight and effectively decreasing substantially in half the magnitude of the ripple content. Effective filtering is the additional benefit of the frequency doubling in airborne applications, where the use of aluminum electrolytic or film capacitors is restricted or prohibited, thereby necessitating the use of expensive tantalum capacitors.

FIG. 2 further shows voltage regulator 44 to provide active regulation of the output voltage. Any variation in DC output voltage is compensated by the active regulation, enabling the AC to DC converter to operate over a wide range of input frequencies.

The RTR possesses the characteristics of the 12-pulse rectification featuring near-unity power factor and low line harmonics, while eliminating the need for heavy interphase reactors, typically associated with such rectification. Since the DC voltage generated by the autotransformer-based 12-pulse rectification shows only small variations as a function of line frequency, the RTR accommodates the extended range of 360 Hz to 800 Hz with no major impact on its size and/or weight. Other operational parameters are practically frequency-invariant as well.

Figure 3:
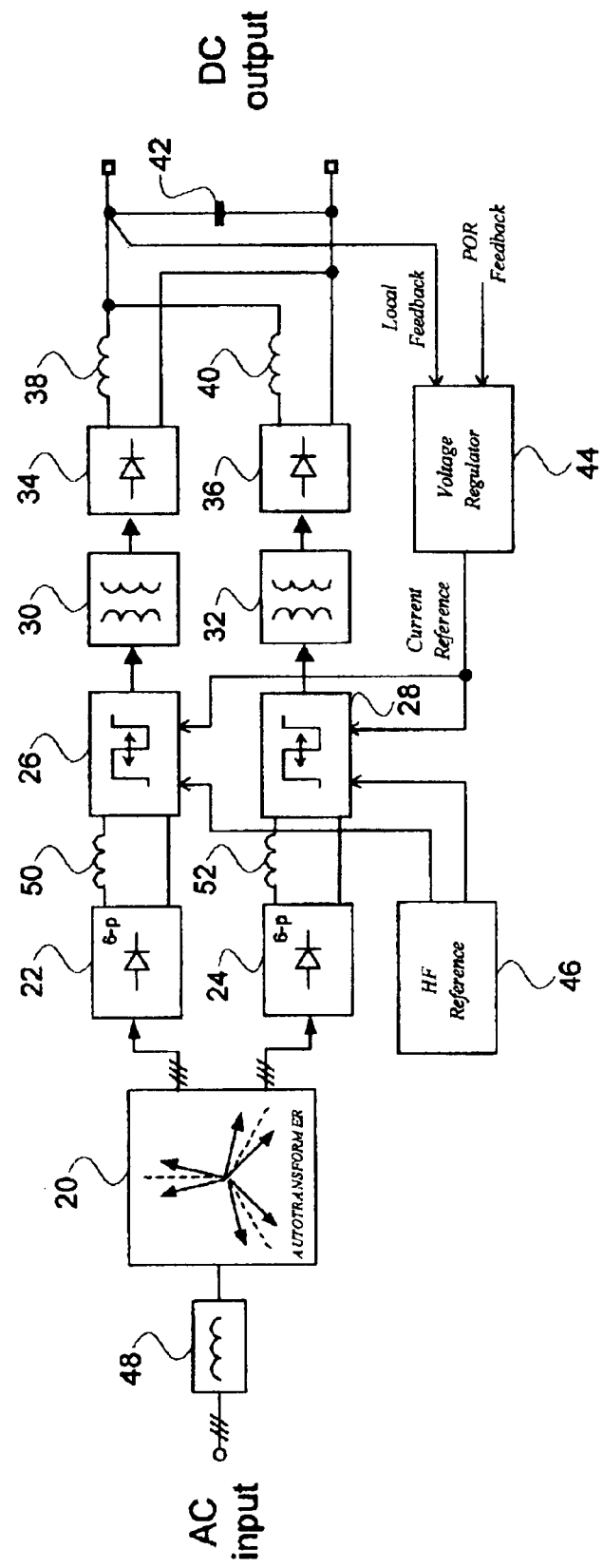
FIG. 3 shows a block diagram of another embodiment of a regulated AC to DC converter according to the present invention.

FIG. 3 shows a block diagram of another embodiment of the present invention. This embodiment is similar to the one described with reference to FIG. 2, and since in all figures, elements identified by the same reference numerals denote the same element, the full description of FIG. 3 will be omitted to avoid verbosity, and only new elements will be described. In particular, discontinuous input-current topologies with capacitive input characteristics can be accommodated by inductances shown in the figure. Typically, a small reactance, represented by inductor 48 between the source and the input to autotransformer 20, sufficiently isolates the DC link capacitance from the source. Further reduction of higher order harmonic currents and HF noise is achieved by placing additional inductors 50, 52 at the input of the HF conversion stages.

Figure 4:
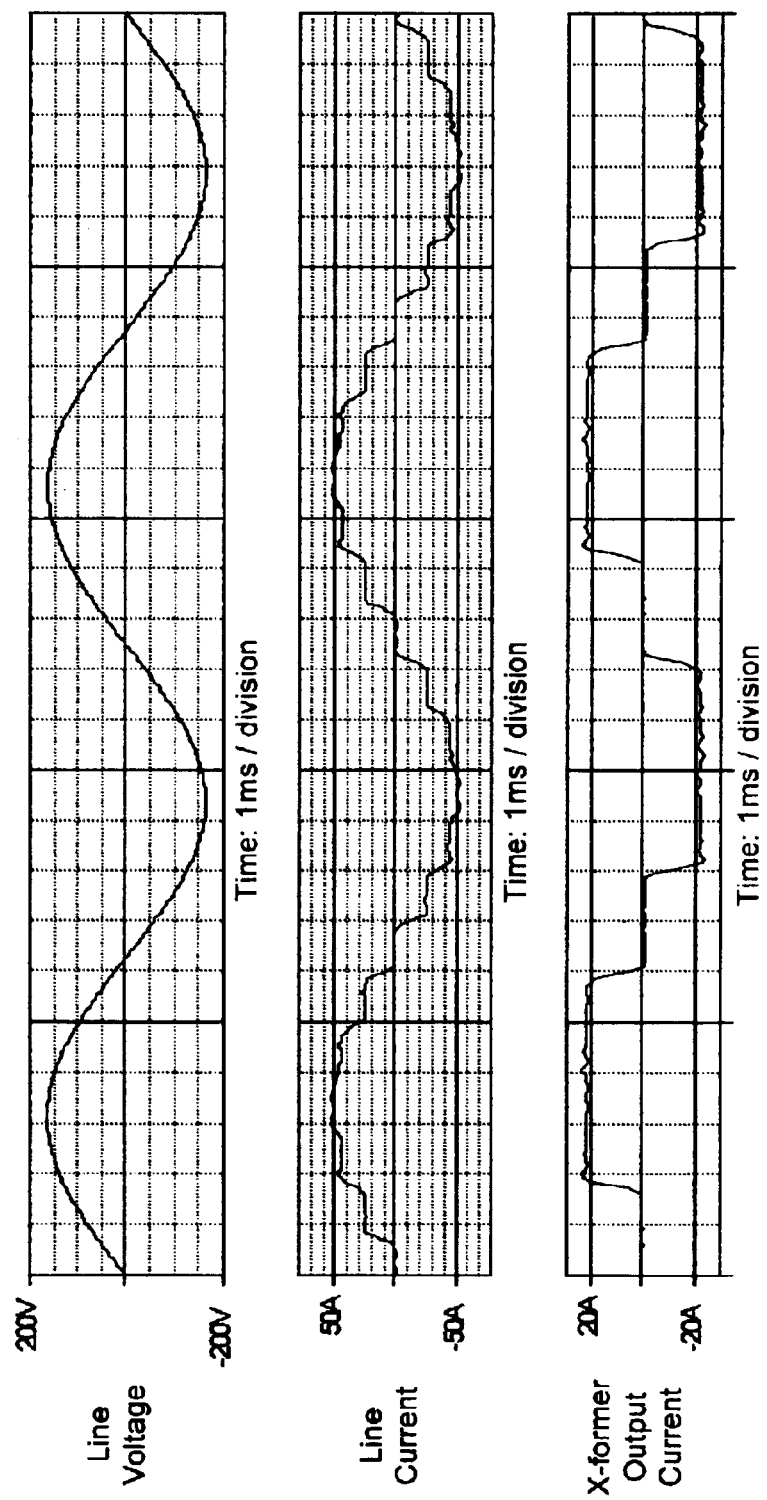
FIG. 4 shows graphs of various voltages and currents at the input stage of the regulated AC to DC converter according to the first embodiment of the present invention.
Figure 5:
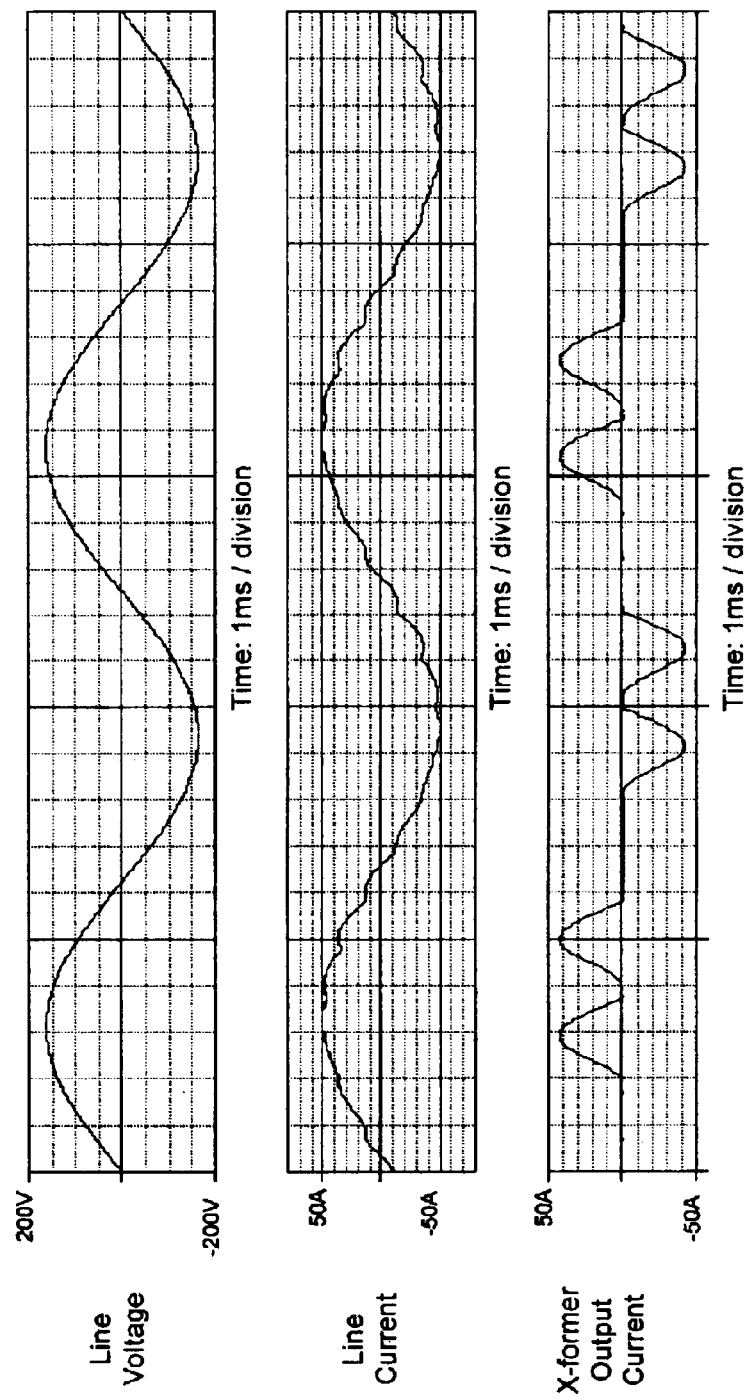
FIG. 5 shows graphs of various voltages and currents at the input stage of the regulated AC to DC converter according to the second embodiment of the present invention.

Typical waveforms of the two input rectifying arrangements according to the embodiments of the present invention are shown in FIGS. 4 and 5, respectively. In particular, FIG. 4 shows graphs of line voltage and current at the input to autotransformer 20 and current at the output of autotransformer 20 in the first embodiment of the present invention described with reference to FIG. 2. FIG. 5 shows graphs of line voltage and current at the input to autotransformer 20 and current at the output of autotransformer 20 in the second embodiment of the present invention described with reference to FIG. 3.

Figure 6:
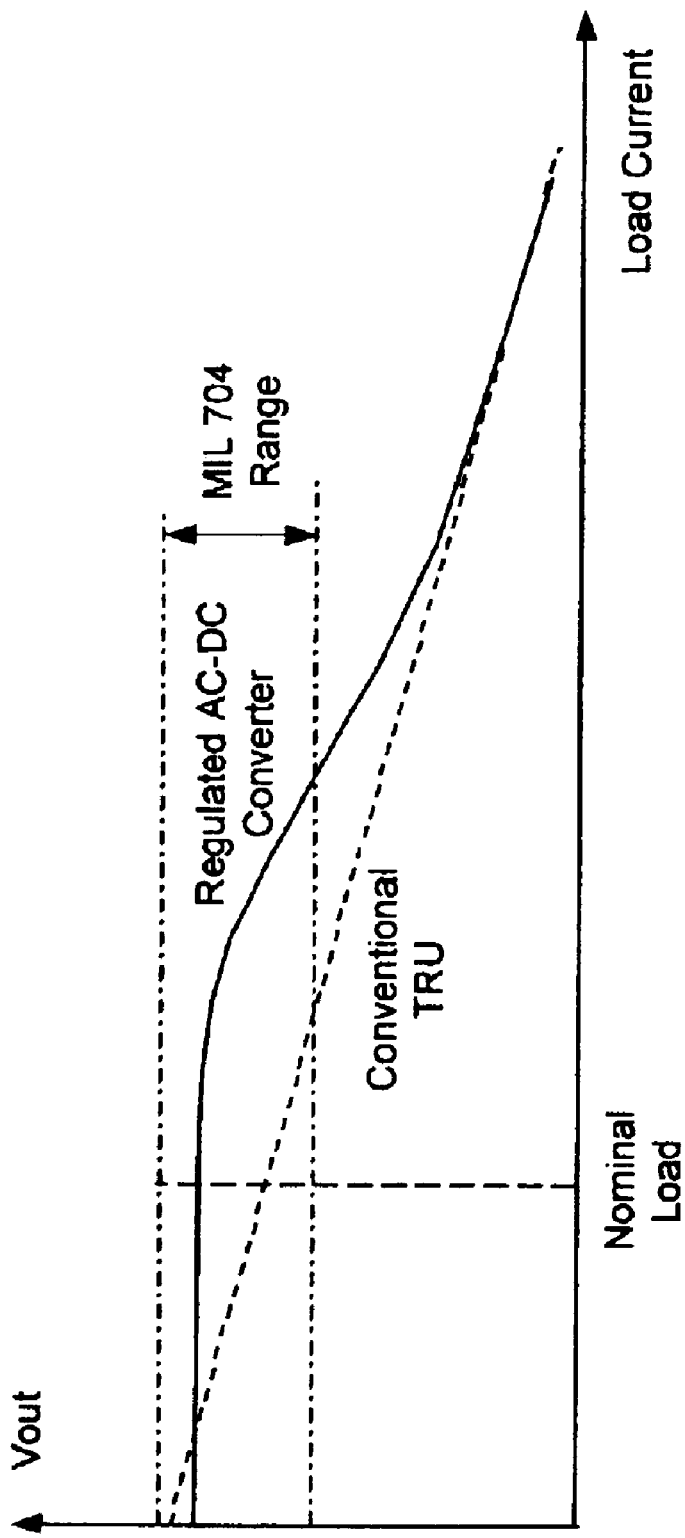
FIG. 6 shows graphs of output voltage and load current of the regulated AC to DC converter according to the present invention.

Since the full power flow is subjected to switch-mode processing, it is fully controllable. This permits "electronic shaping" of the output voltage-current characteristics, steady-state and dynamic, to accommodate the various application requirements. An example of such electronically shaped characteristic is shown in FIG. 6. This figure shows a graph of voltage vs. current in the low-impedance regulated region, extending from no-load to nominal load, which is allowed to transition gradually during heavy overload into a higher-impedance region, thereby limiting the short-circuit current. In contrast to the behavior of the conventional TRU, the short-circuit current under the switch-mode control is not reflected in the primary current and does not overstress the primary side contactors in accordance with the present invention. If required, disabling the operation of the high-frequency switching converters 26, 28 can stop the flow of power through the AC to DC converter. This allows a much greater flexibility in responding to abnormal operating conditions than typically used in conventional schemes. The behavior and operating characteristics of the AC to DC converter make it compatible with modern aircraft power systems.

Figure 7:
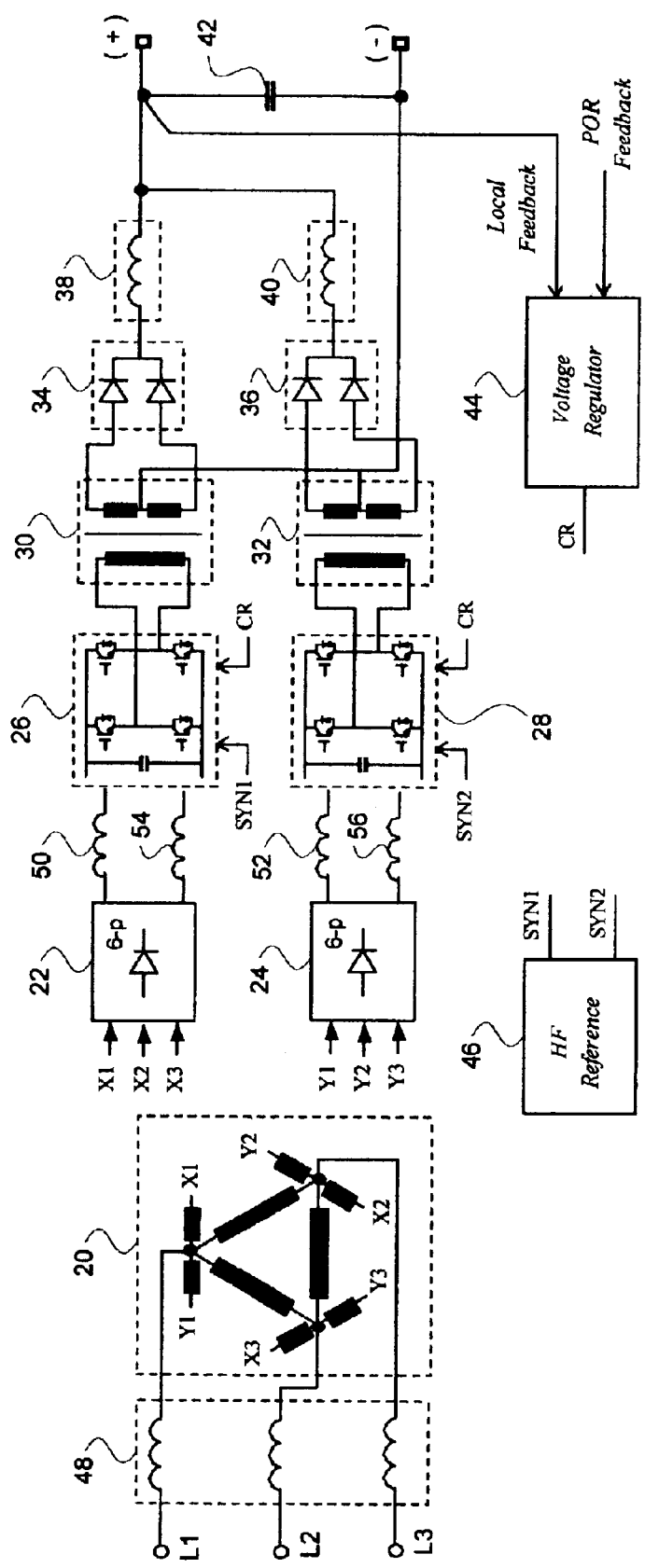
FIG. 7 shows a circuit diagram of the preferred embodiment of the regulated AC to DC converter according to the present invention.

FIG. 7 shows a circuit diagram of the preferred embodiment of the AC to DC converter according to the present invention. The 12-pulse rectification is achieved by using symmetrical +/−15 electrical degrees phase-shifting autotransformer 20, E-core type, with an arrangement of three windings per column, as an example. Autotransformer 20 is connected to a 3-phase AC source via lines L1, L2, L3 and an optional 3% line reactor 48, for example. The transformer output lines X1, X2, X3, which are phase shifted −15 electrical degrees with respect to the corresponding phases of the AC source, are connected to the input of the 6-pulse rectifier bridge 22. Transformer lines Y1, Y2, Y3, which are phase-shifted +15 electrical degrees, are connected to another 6-pulse rectifier bridge 24. Rectifiers 22, 24 provide DC power to switching converters 26, 28, respectively, whereby the connections between the rectifiers' outputs and corresponding inputs are made through optional inductors 50, 52, 54, 56, which may be rated 50 μH, for example.

As further illustrated in FIG. 7, the unregulated DC power provided by rectifiers 22, 24 is processed by two identical, Insulated Gate Bipolar Transistor (IGBT) based, H-Bridge switching converters 26, 28, operating in Peak-Current mode. This method of control provides an excellent rejection of the ripple voltages generated as a result of the 6-pulse rectification, as well as the voltage transients propagating from the AC source. In addition, the cycle-by-cycle Peak-Current control provides a fast response to the load variations, including short-circuit. As an alternative, Average-Current or some other suitable type of control can also be used in the present invention, as known to those skilled in the art of switching converters.

In the preferred embodiment, the Peak-Current control is executed locally. The Peak Current Command, common for both channels, is generated by voltage regulator 44, typically being proportional integral and derivative (PID) type, with two voltage regulation loops: local sensing and remote sensing, known as Point of Regulation (POR). Voltage regulator 44 executes the control function to provide voltage-current characteristics shown in FIG. 6. This type of characteristic is well suited for avionic loads with high in-rush currents or having constant-power characteristics.

Switching converters 26, 28 generate the PWM power for energizing the primary windings of the high-frequency, isolating, step-down transformers 30, 32, respectively. The power obtained from the secondary windings and rectified in rectifiers 34, 36 is connected to the single output (+) through inductors 38, 40, respectively. The power return (−) is connected to the center-tap points of transformers 30, 32. The rectification of the present invention is more efficient than the bridge arrangements used in a conventional TRU. According to the present invention, the full output current passes through the parallel-connected diode rectifier junctions, while the conventional circuits conduct this same current through two series-connected junctions, thereby exhibiting higher total voltage drop and losses. The gain in the output rectification and in the input transformer of the preferred embodiment offsets the combined losses of the 6-pulse rectifiers and the switching converters. As a result, the overall efficiency of the AC to DC converter can be in the range of 90%.

Figure 8A:
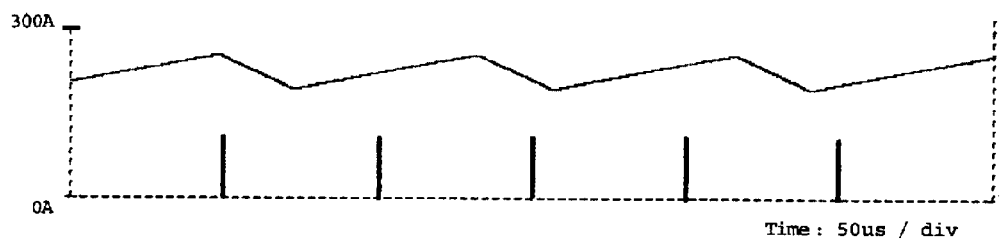
FIGS. 8A–8D show graphs of various voltages and currents at the output stage of the regulated AC to DC converter according to the present invention.
Figure 8B:
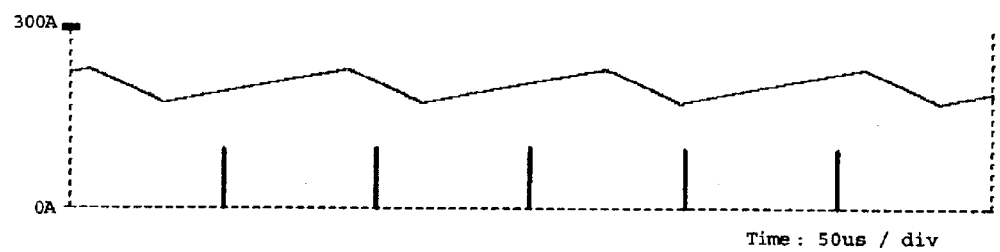
Figure 8C:
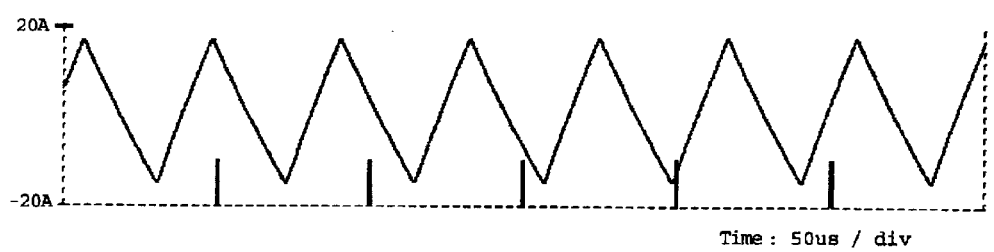
Figure 8D:
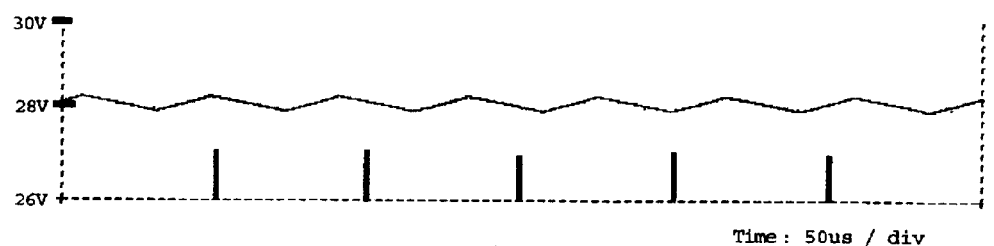

Inductors 38, 40 and capacitor 42, which is connected across the output terminals, form a ripple-attenuating filter. In order to minimize the size and weight of the filter, the control of the PWM bridges includes synchronization of the HF switching via HF Reference unit 46, such that the switching PWM pattern in one channel is shifted by a half switching cycle from another. The combined effect doubles the fundamental component of the ripple current flowing through output capacitor 42, while the frequency of the ripple currents flowing through inductors 38, 40 remain substantially unchanged. FIGS. 8A–8D show graphs of various voltages and currents at the output stage of the AC to DC converter. In particular, FIG. 8A shows a graph of current flowing through DC inductor 38, and FIG. 8B shows a graph of current flowing through inductor 40. FIG. 8C shows a graph of current flowing through output capacitor 42, being twice the frequency of currents through inductors 38, 40 as illustrated in FIGS. 8A and 8B. FIG. 8D shows a graph of output voltage across the output terminals (+) and (−). Waveforms in the output filtering section, shown in FIGS. 8A–D, illustrate the phase shifting effect of switching converters 26, 28 operating, as an example, at 6 kHz and filter components, comprising inductors 38, 40 and output capacitor 42, rated, as an example, 13 μH and 4.6 mF, respectively. The output filter may also include some additional components required to attenuate EMI effects (not shown), which may reduce the magnitude of the output ripple voltage effects even further.

Component weight of the preferred embodiment is within 105 to 110% range relative to the component weight of the conventional TRU of the same current rating. Since under the rated current the AC to DC converter provides approximately 5 to 10% more power, the effective weight of the RTR remains practically unchanged and can be even lower than the conventional TRU.

Figure 9:
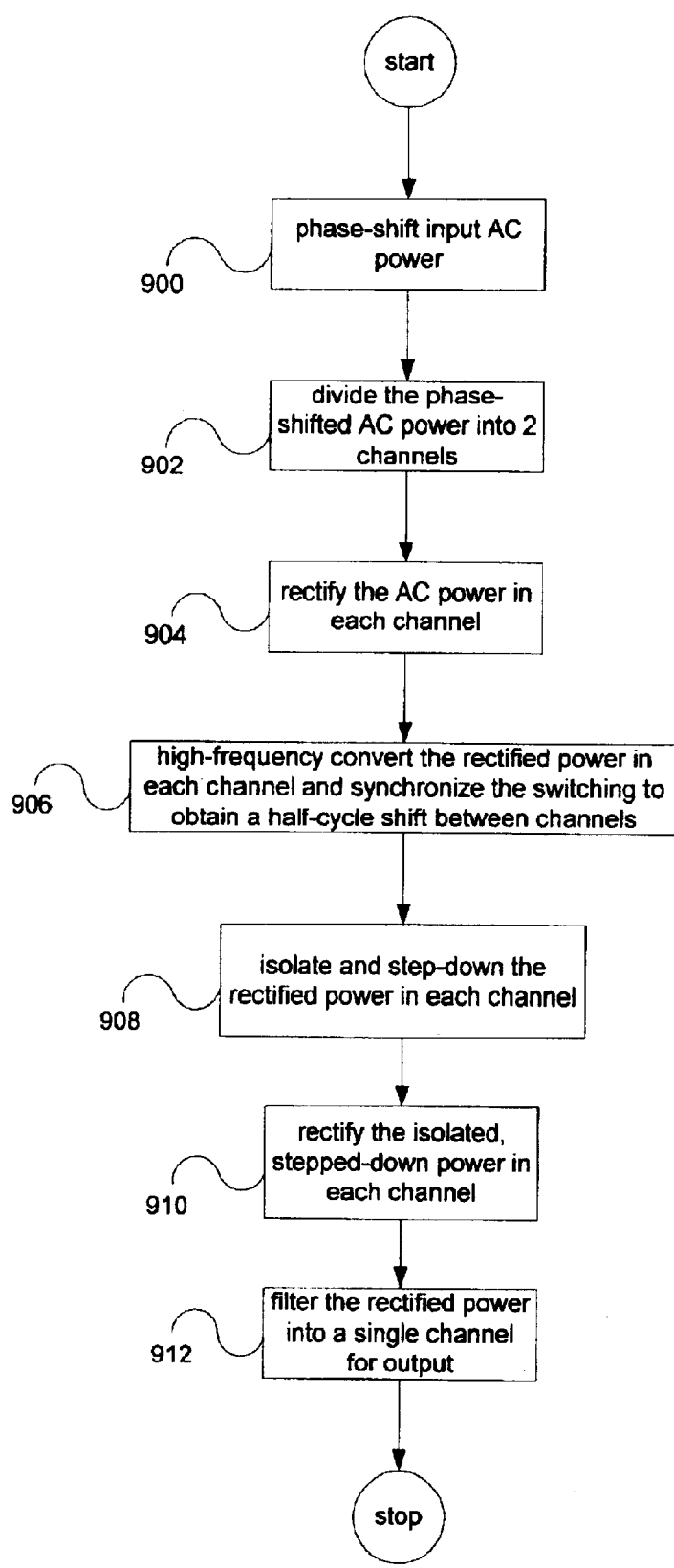
FIG. 9 is a process flow diagram for converting AC power to regulated DC power in accordance with the present invention.

FIG. 9 is a process flow diagram for converting AC power to regulated DC power in accordance with the present invention. As shown in the figure, input 3-phase AC power is phase-shifted in step 900. The phase-shifted AC power is then divided into 2 channels in step 902. In step 904, the AC power is rectified in each channel. In step 906, the rectified power is high-frequency converted or chopped in each channel, and the switching is synchronized to obtain a half-cycle shift between channels. The chopped power is then isolated and stepped down in each channel in step 908. In step 910, the isolated and stepped-down power is rectified in each channel, which is then filtered into a single output channel in step 912.

It will be appreciated that a number of phase-shifting autotransformer topologies, as known to those skilled in the art of transformers, can be used in the present invention. In addition, line reactance 48 and autotransformer 20 can be built as a single component.

It will be further appreciated that although an autotransformer is shown and described in the above embodiments, any other transformer may be used in the input stage of the AC to DC converter without detracting from the spirit and scope of the present invention.

While the present invention has been described and illustrated in connection with the above embodiments, many variations and modifications, as will be evident to those skilled in the art, may be made without departing from the spirit and scope of the present invention. The present invention is thus not to be limited to the precise details of methodology or construction set forth above, as such variations and modifications are intended to be included within the scope of the present invention.

What is claimed is:

1. A regulated AC to DC converter for converting AC power into regulated DC power, comprising:
   an input transformer for receiving and phase-shifting 3-phase AC power and for dividing the phase-shifted AC power into 2 channels;
   a set of 6-pulse rectifiers in each of said 2 channels, coupled to said transformer, for rectifying the phase-shifted AC power;
   a high frequency switching converter in each of said 2 channels, respectively coupled to said set of rectifiers, for chopping the rectified power;
   a step-down transformer in each of said 2 channels, respectively coupled to said switching converter, for isolating and stepping down the chopped power;
   an output rectifier in each of said 2 channels, respectively coupled to said step-down transformer, for further rectifying the stepped down power; and
   a filter, coupled to said output rectifiers, for filtering the further rectified power to produce a low ripple DC power that is regulated by controlling each said high frequency switching converter.

2. The regulated AC to DC converter according to claim 1, wherein said filter comprises an inductor in each of said 2 channels, respectively coupled to said output rectifier, for limiting an amplitude of high-frequency ripple currents, and further comprises a capacitor, coupled to said inductors, for smoothing output current that is combined from said 2 channels into a single output.

3. The regulated AC to DC converter according to claim 1, further comprising a line reactor, connected to an input of said input transformer, for isolating input DC link capacitances, and further comprising an inductor in each of said 2 channels, connected to an input of each said switching converter, for reducing high order harmonic currents and high frequency noise.

4. The regulated AC to DC converter according to claim 1, wherein said input transformer is an autotransformer.

5. The regulated AC to DC converter according to claim 4, wherein said autotransformer phase-shifts said 3-phase AC power by +/−15 electrical degrees.

6. The regulated AC to DC converter according to claim 1, further comprising a high-frequency reference unit for synchronizing each said high frequency switching converter in such a way that output power of one of said switching converters is offset substantially by a half cycle from output power of another of said high frequency switching converters.

7. The regulated AC to DC converter according to claim 1, further comprising a voltage regulator for sensing an output DC voltage of said regulated AC to DC converter and controlling each said high frequency switching converter in response to the sensed output DC voltage.

8. The regulated AC to DC converter according to claim 7, wherein said voltage regulator is arranged in a feedback closed-loop configuration to sense the output DC voltage either locally or remotely.

9. The regulated AC to DC converter according to claim 1, wherein each said high frequency switching converter operates in a high-frequency pulse-width-modulation mode.

10. The regulated AC to DC converter according to claim 1, wherein said 3-phase AC power has a variable frequency range of about 360 Hz to 800 Hz.

11. An aerospace system for generating regulated DC power from AC power, comprising:
    an AC power source for generating 3-phase AC power;
    an input transformer for receiving and phase-shifting said 3-phase AC power and for dividing the phase-shifted AC power into 2 channels;
    a set of 6-pulse rectifiers in each of said 2 channels, coupled to said transformer, for rectifying the phase-shifted AC power;
    a high frequency switching converter in each of said 2 channels, respectively coupled to said set of rectifiers, for chopping the rectified power;
    a step-down transformer in each of said 2 channels, respectively coupled to said high frequency switching converter, for isolating and stepping down the chopped power;
    an output rectifier in each of said 2 channels, respectively coupled to said step-down transformer, for further rectifying the stepped down power, and a filter, coupled to said output rectifiers, for filtering the further rectified power to produce a low ripple DC power that is regulated by controlling each said high frequency switching converter.

12. The system according to claim 11, wherein said filter comprises an inductor in each of said 2 channels, respectively coupled to said output rectifier, for limiting an amplitude of high-frequency ripple currents, and further comprises a capacitor, coupled to said inductors, for smoothing output current that is combined from said 2 channels into a single output.

13. The system according to claim 11, further comprising a line reactor, connected to an input of said input transformer, for isolating input DC link capacitances, and further comprising an inductor in each of said 2 channels, connected to an input of each said high frequency switching converter, for reducing high order harmonic currents and high frequency noise.

14. The system according to claim 11, wherein said input transformer is an autotransformer.

15. The system according to claim 11, further comprising a high-frequency reference unit for synchronizing each said high frequency switching converter in such a way that output power of one of said high frequency switching converters is offset substantially by a half cycle from output power of another of said high frequency switching converters.

16. The system according to claim 11, further comprising a voltage regulator for sensing an output DC voltage and controlling each said high frequency switching converter in response to the sensed output DC voltage.

17. The system according to claim 11, wherein said 3-phase AC power has a variable frequency range of about 360 Hz to 800 Hz.

18. A regulated AC to DC converter for converting AC power into regulated DC power, comprising:

an autotransformer for receiving and phase-shifting 3-phase AC power by +/−15 electrical degrees and for dividing the phase-shifted AC power into 2 channels;

a set of 6-pulse rectifiers in each of said 2 channels, coupled to said autotransformer, for rectifying the phase-shifted AC power, a high frequency switching converter in each of said 2 channels, respectively coupled to said set of rectifiers, for chopping the rectified power, each said high frequency switching converter operating in a high-frequency pulse-width-modulation mode;

a step-down transformer in each of said 2 channels, respectively coupled to said switching converter, for isolating and stepping down the chopped power;

an output rectifier in each of said 2 channels, respectively coupled to said step-down transformer, for further rectifying the stepped down power;

a filter, coupled to said output rectifiers, for filtering the further rectified power to produce a low ripple DC power that is regulated by controlling each said high frequency switching converter;

a high-frequency reference unit for synchronizing each said high frequency switching converter in such a way that output power of one of said switching converters is offset substantially by a half cycle from output power of another of said high frequency switching converters; and a voltage regulator, arranged in a feedback closed-loop configuration, for sensing an output DC voltage of said regulated AC to DC converter and controlling each said high frequency switching converter in response to the sensed output DC voltage.

19. The regulated AC to DC converter according to claim 18, wherein said filter comprises an inductor in each of said 2 channels, respectively coupled to said output rectifier, for limiting an amplitude of high-frequency ripple currents, and further comprises a capacitor, coupled to said inductors, for smoothing output current that is combined from said 2 channels into a single output.

20. The regulated AC to DC converter according to claim 18, further comprising a line reactor, connected to an input of said input transformer, for isolating input DC link capacitances, and further comprising an inductor in each of said 2 channels, connected to an input of each said switching converter, for reducing high order harmonic currents and high frequency noise.

* * * * *